United States Patent
Calabrese

(10) Patent No.: US 9,157,567 B1
(45) Date of Patent: Oct. 13, 2015

(54) TRAVELER'S LAPTOP WORKSTATION

(71) Applicant: Peter Anthony Calabrese, Auburn, PA (US)

(72) Inventor: Peter Anthony Calabrese, Auburn, PA (US)

( * ) Notice: Subject to any disclaimer, the term of this patent is extended or adjusted under 35 U.S.C. 154(b) by 0 days.

(21) Appl. No.: 14/321,477

(22) Filed: Jul. 1, 2014

Related U.S. Application Data

(60) Provisional application No. 61/843,293, filed on Jul. 5, 2013.

(51) Int. Cl.
*A45F 3/00* (2006.01)
*F16M 11/04* (2006.01)
*F16M 13/02* (2006.01)

(52) U.S. Cl.
CPC ............... *F16M 11/04* (2013.01); *F16M 13/02* (2013.01)

(58) Field of Classification Search
CPC ........ A45C 9/00; A45C 13/26; A45C 13/262; A45C 2013/267; A45C 13/28; A47B 23/002
USPC ................ 248/444, 304, 308, 339, 340, 460, 248/222.51, 222.52; 361/679.03, 679.55; 224/627, 639, 259; 190/18 A, 11, 107, 190/102
See application file for complete search history.

(56) References Cited

U.S. PATENT DOCUMENTS

| | | | | |
|---|---|---|---|---|
| 2,685,757 A * | 8/1954 | Mirigian | ...................... | 248/444 |
| 2,996,830 A * | 8/1961 | Reichmuth | .................... | 248/444 |
| 3,009,613 A * | 11/1961 | Noland | ........................ | 224/265 |
| 4,290,633 A * | 9/1981 | Sullivan | ........................ | 292/114 |
| 4,715,293 A * | 12/1987 | Cobbs | .............................. | 108/43 |
| 5,074,222 A * | 12/1991 | Welch | .............................. | 108/43 |
| 5,263,423 A * | 11/1993 | Anderson | ........................ | 108/43 |
| 5,476,163 A * | 12/1995 | Wu | .................................. | 190/115 |
| 5,762,169 A * | 6/1998 | Deliman et al. | .............. | 190/101 |
| 5,829,559 A * | 11/1998 | Nordstrom et al. | ........... | 190/102 |
| 5,890,571 A * | 4/1999 | Sadow | .......................... | 190/102 |
| 6,105,508 A * | 8/2000 | Ryburg | ........................... | 108/42 |
| 6,267,257 B1 * | 7/2001 | DeBruyn | ............... | 211/119.004 |
| 6,471,019 B1 | 10/2002 | Miller | | |
| 6,663,072 B1 * | 12/2003 | Ritchey et al. | ................ | 248/444 |
| 7,191,926 B1 * | 3/2007 | Costantino et al. | ........... | 224/605 |
| 7,213,692 B2 | 5/2007 | Wang et al. | | |
| 7,318,507 B2 * | 1/2008 | Fenton et al. | ................... | 190/39 |
| 7,364,129 B1 | 4/2008 | Levari, Jr. | | |
| 7,819,247 B2 | 10/2010 | Gonzalez | | |
| 7,946,609 B2 | 5/2011 | Johnson et al. | | |
| 7,987,955 B2 | 8/2011 | Puchalski | | |
| 8,020,829 B1 * | 9/2011 | Tamayori | ................... | 248/447.2 |
| 8,146,722 B1 | 4/2012 | Moreno et al. | | |
| 8,307,966 B2 * | 11/2012 | Cummins | ..................... | 190/102 |
| 2004/0200870 A1 * | 10/2004 | Haber | .......................... | 224/259 |
| 2007/0246991 A1 * | 10/2007 | Farah | ....................... | 297/423.39 |
| 2009/0107788 A1 * | 4/2009 | Lin | ................................ | 190/115 |
| 2009/0224118 A1 * | 9/2009 | Meyers | ......................... | 248/215 |
| 2009/0229497 A1 * | 9/2009 | Persico et al. | ................... | 108/43 |
| 2009/0236383 A1 * | 9/2009 | Dapkins et al. | ................ | 224/627 |
| 2009/0272779 A1 * | 11/2009 | Vu | ................................. | 224/677 |
| 2010/0187062 A1 * | 7/2010 | Sweeney et al. | ................... | 190/1 |
| 2010/0187063 A1 * | 7/2010 | Sperry | ............................ | 190/11 |
| 2011/0139560 A1 * | 6/2011 | Via | ............................... | 190/102 |
| 2012/0161408 A1 * | 6/2012 | Sidhu | .......................... | 280/47.38 |
| 2013/0153351 A1 * | 6/2013 | House, Iii | ....................... | 190/11 |

* cited by examiner

*Primary Examiner* — Terrell McKinnon
*Assistant Examiner* — Michael McDuffie
(74) *Attorney, Agent, or Firm* — Cheryl R. Figlin, Esq.; Feigin & Associates, LLC.

(57) ABSTRACT

A device for holding a laptop that connects to luggage. The device is easy to store and set up having two rigid members, spacer bar, flexible strap and flexible strap closure.

17 Claims, 8 Drawing Sheets

TRAVELER'S LAPTOP WORKSTATION

This application claims priority to U.S. Provisional Application Ser. No. 61/842,293 which is hereby incorporated by reference. The disclosed technology described herein addresses an unfulfilled need in the prior art by providing a surface for holding a laptop attached to a telescoping arm of luggage, suitcase or computer storage case that is light weight and easy to transport, set up and disassemble.

FIELD OF THE DISCLOSED TECHNOLOGY

The disclosed technology relates to laptop computer workstation for attachment to luggage and computer storage case with telescoping retractable pull arm including carry-on luggage.

BACKGROUND OF THE DISCLOSED TECHNOLOGY

Laptop computers are fantastic for portable use. Many people use them on their lap as the name suggests, however, this is not comfortable or ergonomically sound for long use. Many people use them on tables or special stands. When traveling with traveling case such as luggage it is very advantageous to have a place to put the laptop. It would be convenient to have a portable work surface for use with a luggage carrier that is light weight as well as easy to set up, disassemble and store.

SUMMARY OF THE DISCLOSED TECHNOLOGY

One objective is a device for creating a surface for holding a laptop on a telescoping arm of a traveling case in assembled mode comprising two spaced apart rigid members, which are parallel at a first end and central region. Also a second end is obtuse relative to each other. The first end is defined by the distance extending between hooks at an extreme end of the rigid members and an acute bend. The acute bend being acute relative to the rest of the respective rigid members.

The second end having an obtuse angle between each of the spaced apart, rigid members. Further comprising a central region that is between the first and second ends and has a flexible strap, which extends perpendicular to the first end of the rigid members and is connected at the central region to both rigid members. The flexible strap adapted for attachment to a laptop computer.

Another objective is for the flexible strap to span an area created by the spaced apart rigid members. The device has a spacer bar located between the spaced apart rigid members and longer than the distance of the spaced apart rigid members. The spacer bar is connected to the rigid members at a backside of the rigid members and on the rigid members first end near the acute bend.

In another objective the traveling case is one of the following: suitcase, briefcase, computer storage case or luggage. Also the device has a disassembled mode. The spacer bar engages a vertical section of telescoping arm such that the device is securely connected to the traveling case. The central region and second end further comprises at least two pads and preferably 5 pads of non-slip material on a front side of rigid members and these pads are used to rest the laptop on.

Also an objective is to have a device wherein the flexible straps are used to close around and hold a laptop once placed on the pads. This flexible strap is secured with a buckle, Velcro®, hook, or snap. The device's central region is twenty degrees below a horizontal plane that is perpendicular to the traveling case.

In yet another objective, the spacer bar is connected moveably and permanently to only one of the rigid members and is movable around a vertical axis of the movable and permanent connection. The spacer bar is also removably attached to a second rigid member with a protrusion at a back side of the second rigid member and on the second rigid member's first end near the acute bend. This protrusion engages an indent on the spacer bar when the device is in assembled mode. The rigid members and spacer bar are made of one of the following materials; aluminum, steel, stainless steel, plastic, acrylic, bent wood and brass. The rigid members are rectangular cylinders of between ¾ to ⅞ of an inch wide or the rigid members are round cylinders between ¾ to ⅞ of an inch diameter.

Another objective is for the spacer bar to be between 6 to 8 inches long and the rigid members are between 8 to 12 inches long from the acute bend to second end.

In another objective the device in disassembled mode the spacer bar is unconnected to the second rigid member and rotated to a position adjacent and parallel to both rigid members. The rigid members are permanently attached by flexible straps, and rigid members are moved adjacent to each other such that the device in now in a low profile for storage.

Another objective is to have a method of using the device wherein a disassembled device with the spacer bar not connected to the second rigid member and parallel to the rigid members is removed from storage. The spacer bar is then moved around the vertical axis to removably attach to the second rigid member. Then hooks are hooked onto a handle portion of telescoping arm of a traveling case and spacer bar is engaged to rest against the vertical portion the telescoping arm. After this a laptop is then placed on a central region and second end and flexible straps are placed around laptop and connected to hold laptop securely in place.

In a final objective a method of taking disassembling the device, first a laptop is taken off the device by disconnecting flexible straps from around the laptop. Laptop is then lifted off the device. Hooks are then unhooked from telescoping arm handle. Now spacer bar is unattached from the second rigid member and moved around the vertical axis and positioned adjacent to and parallel to the rigid members. Thus creating a low profile and small size for easy storage.

In accordance with these and other objectives, which will become apparent hereinafter, the disclosed technology will now be described with particular reference to the drawings.

Figure 1:
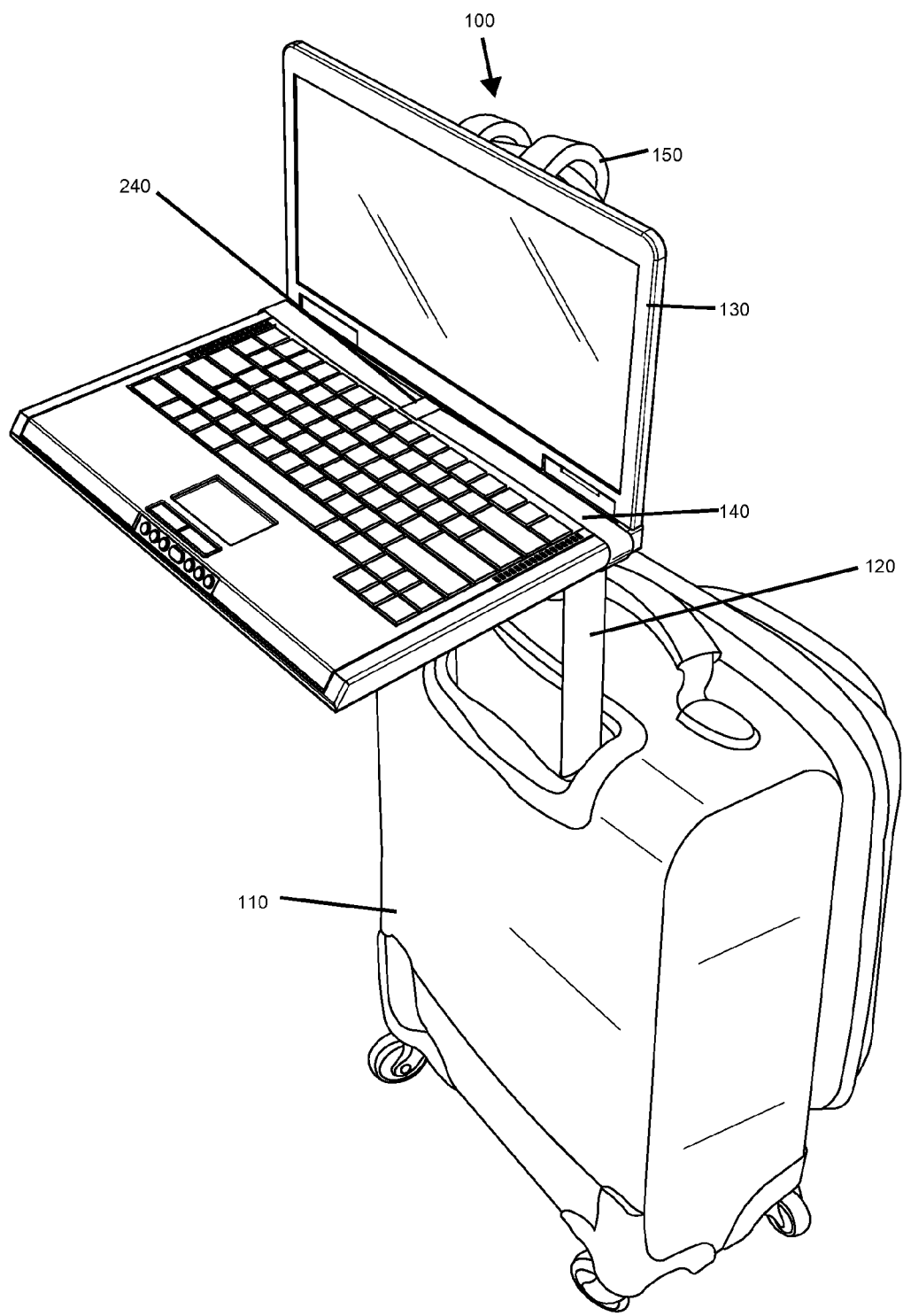
FIG. 1 shows a perspective view of the laptop workstation for carry-on luggage attached to the luggage and supporting a laptop computer.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The ensuing detailed description provides preferred exemplary embodiments only, and is not intended to limit the scope, applicability, or configuration of the disclosed technology. Rather, the ensuing detailed description of the preferred exemplary embodiments will provide those skilled in the art with an enabling description for implementing the preferred exemplary embodiments of the technology. Various changes may be made in the function and arrangement of elements without departing from the spirit and scope of the disclosed technology, as set forth in the appended claims.

To aid in describing the disclosed technology, directional terms may be used in the specification and claims to describe portions of the present technology (e.g., upper, lower, left, right, etc.). These directional definitions are merely intended to assist in describing and claiming the disclosed technology and are not intended to limit the disclosed technology in any way. In addition, reference numerals that are introduced in the specification in association with a drawing figure may be repeated in one or more subsequent figures without additional description in the specification, in order to provide context for other features.

With reference now to the drawings, a device is shown for attaching a laptop to carry-on luggage.

Referring to FIG. 1, reference number 100 refers generally to laptop workstation for attaching to carry-on luggage. Laptop workstation 100 is attached to a telescoping arm 120 of a suitcase, computer storage case, or luggage 110. A laptop computer 130 is held onto laptop workstation 100 by straps 140 closed with a buckle 240.

Figure 2:
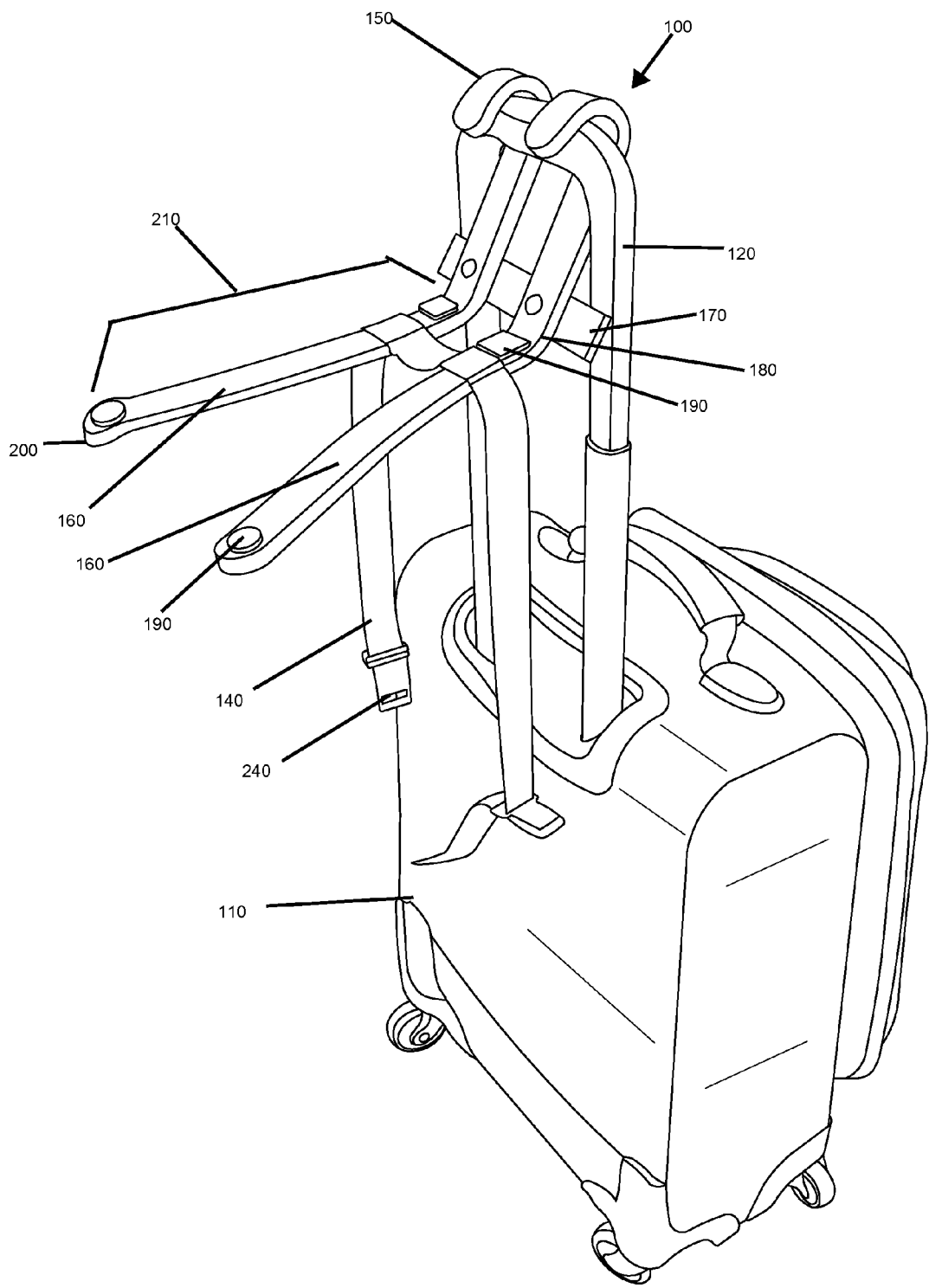
FIG. 2 shows a perspective view of the laptop workstation for carry-on luggage attached to the luggage.
Figure 3:
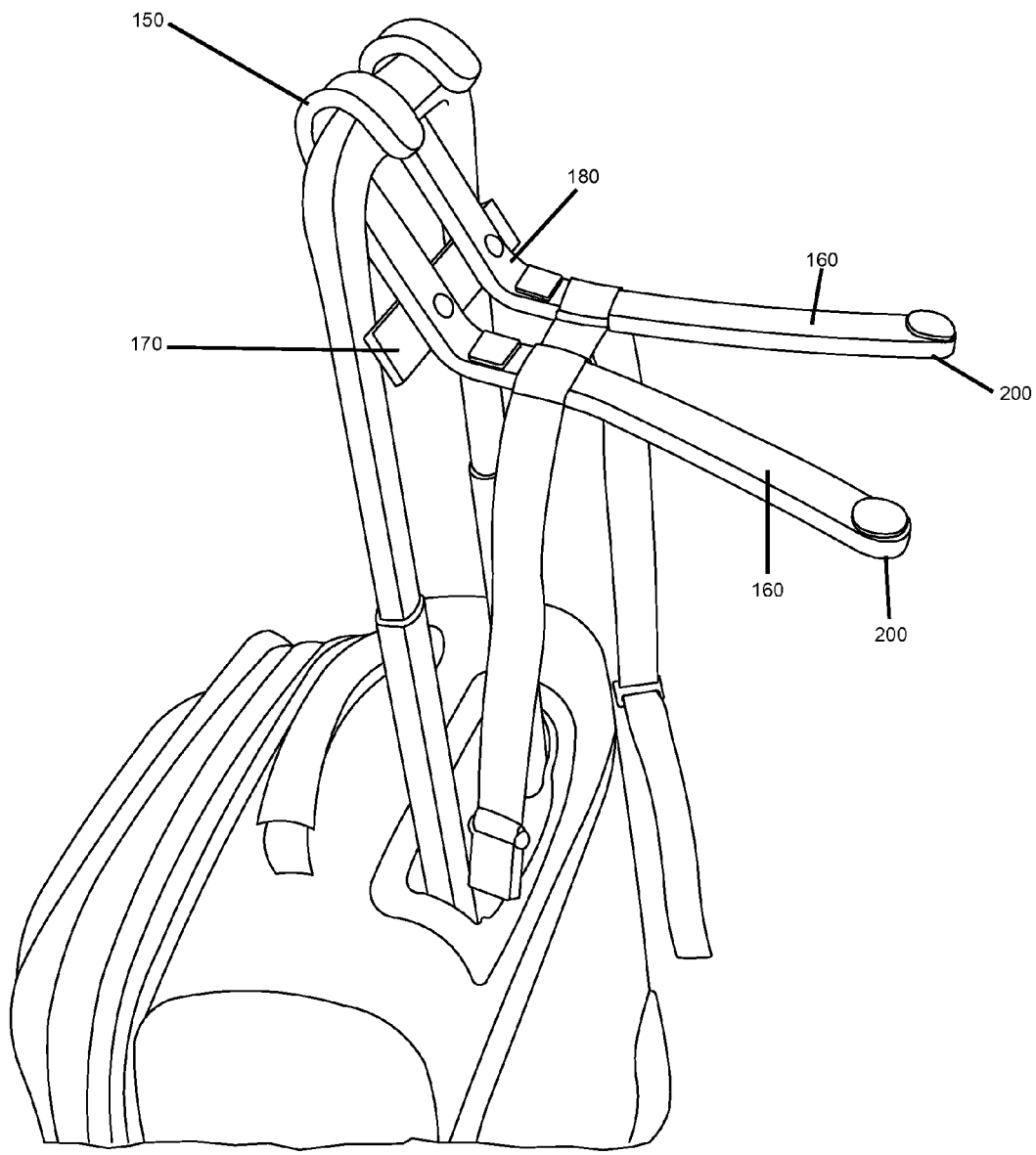
FIG. 3 shows a second perspective view of the laptop workstation for carry-on luggage attached to the luggage.

Moving on to FIGS. 2 and 3, laptop workstation 100 is shown hooked onto luggage 110. Laptop workstation 100 further comprises two rigid members 160. Hooks 150 are at a first end of spaced apart rigid members 160. Rigid members 160 are preferably made of aluminum but other choices of materials are steel, brass, stainless steel, plastics, acrylic, and bent woods. Spacer bar 170 is positioned near an acute bend 180. The acute bends 180 being acute relative to the rest of the respective rigid members 160.

Spacer bar 170 determines the spread between the rigid members 160 and supports the laptop workstation 100 against the luggage 110 telescoping handle 120. Spacer bar 170 would preferably be made of the same material rigid members 160 are made of. The central region 210 between acute bend 180 and second ends 200 has four pads 190 to rest a laptop 130 on. The two spaced apart, rigid members 160 are parallel at a first end near hooks 150 and obtuse, relative to each other, at a second end 200.

Flexible strap 140 extends substantially perpendicular to the parallel extent of the rigid members 160 at the central region 210. The flexible strap 140 is adapted for attachment to the laptop 130. Flexible strap 140 is between rigid members 160 and is used to restrict the spread of the rigid members 160, thus controlling the width and maintaining the form of the laptop workstation 130. In this embodiment, flexible strap 140 is simply wrapped around rigid members 160 and sewn on either side of each rigid member 160, keeping the flexible strap 140 attached to the rigid members 160. Flexible straps are preferably made of nylon. Other choices for the flexible strap 140 include a Velcro® strap or rubber strap.

In another embodiment, the rigid members 160 have recesses to facilitate flexible strap 140 attachments. In this embodiment the flexible strap 140 has two loops, one loop for each rigid member 160. The diameter of these loops is slightly smaller than the width and thickness combined of the corresponding rigid member 160.

These loops stretch when the rigid members 160 are pushed through them. When the loops enter the area with the recesses, the loops of the flexible strap 140 relax and go back to their original size, which is smaller than the corresponding rigid member 160. Thus the loops of the flexible strap 140 are positioned in the recesses, trapping the flexible strap 140 in place.

Rigid members 160 preferably measure five inches from hooks 150 to acute bend 180. Rigid members 160, preferably measures 8 inches from acute bend 180 to second ends 200. Rigid members 160 of this first embodiment preferably are rectangular cylinders and preferably 1 inch wide. Pads 190 are placed on rigid members 160 and are round or rectangular. Pads 190 are preferably between ¾ to ⅞ inches in diameter if round or ¾ to ⅞ inches wide if rectangular.

Figure 8:
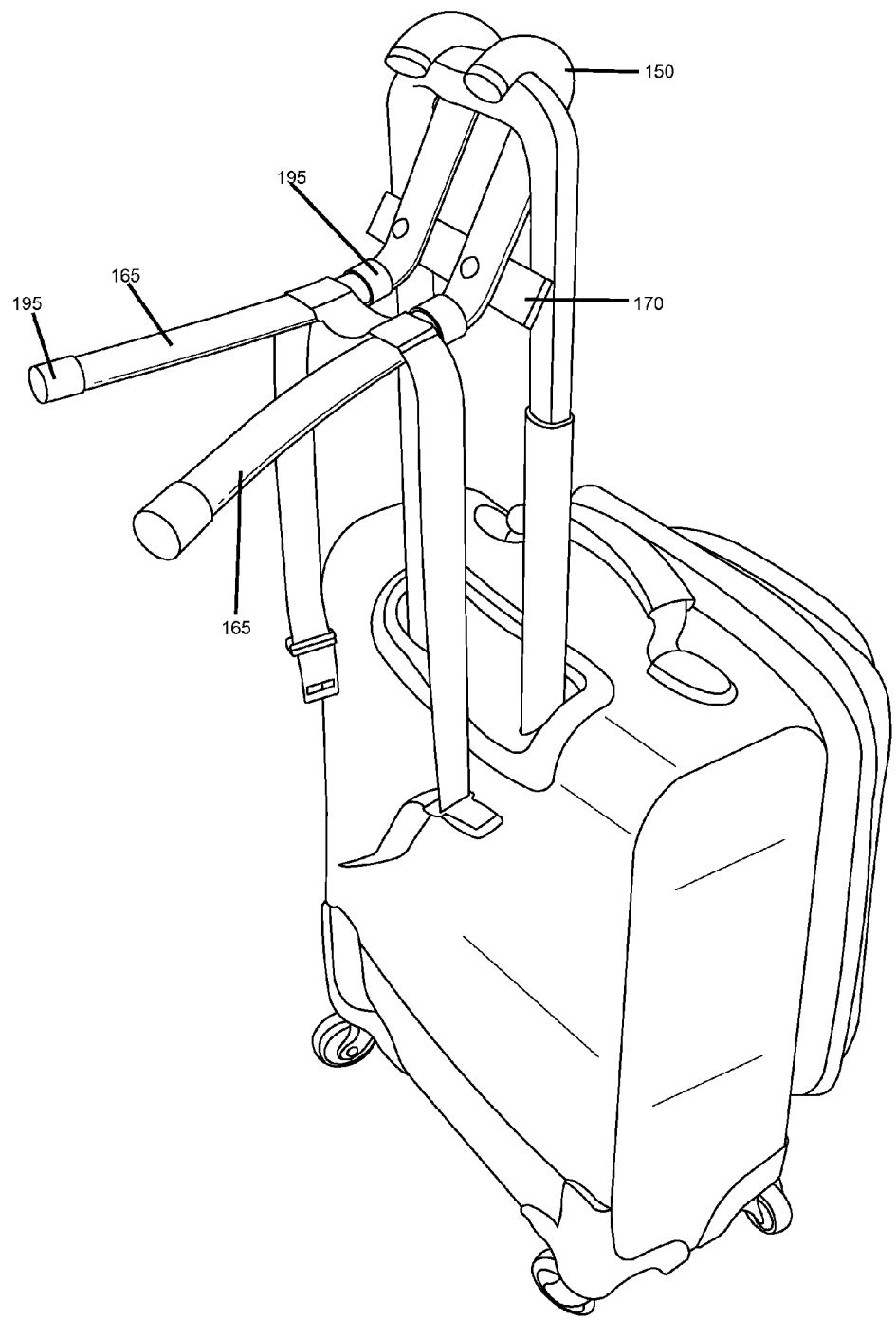
FIG. 8 is a perspective view of a second embodiment of the laptop workstation attached to luggage of the disclosed technology.

Now moving to FIG. 8, rigid members 165 in this embodiment are cylindrical. Rigid members 165 of the second embodiment are either a ½ to ¼ of an inch in diameter. Rigid members 165 are the same as rigid members 160, except they are now a cylindrical. The material of rigid members 165 is preferably a tube of aluminum. Alternatively, rigid members 165 are ⁵⁄₁₆ of an inch diameter solid steel or brass round bar stock. Rigid members 165 have cylindrical caps or sleeves, which act as the pads 195. These cylindrical caps or sleeves 195 are preferably ½ to ¾ of an inch long. Another option for when aluminum is used for rigid members 165 the flexible strap 140 is connected through slots in rigid members 165. The flexible strap 140 slides through slots of rigid members 165 and is sewn in place.

Pads 190 and caps or sleeves 195 are preferably rubber. Alternatively, any non-slip material providing grip to avoid slipping is adequate. Examples of such materials are: silicone rubber, santoprene, thermo plastic rubbers, natural rubber, and neoprene.

Back to FIG. 2, spacer bar 170 is attached to rigid members 160 or 165 at a point near acute bend 180 and on a first end section closer to hooks 150. Spacer bar 170 is longer than the space between rigid members 160 or 165 and also longer than the space between telescoping arms 120 of luggage 110. Spacer bar 170 is preferably 1 inch wide and ¼ of an inch thick. Spacer bar 170 is preferably 6 inches long, and alternatively anywhere between 6 to 8 inches long.

Spacer bar 170 is connected to rigid members 160 or 165. The distance of the spacer bar 170 between the connections to rigid members 160 or 165 is 1½ inches to 4 inches. When the laptop workstation 100 is made of aluminum the distance is preferably 2½ inches. When the laptop workstation 100 is made of acrylic the distance is preferably 3 inches.

Hooks 150 are hooked onto the handle part of telescoping arms 120 and spacer bar 170 is placed against telescoping arms 120. Hooks 150 hang on luggage 110 telescoping arms 120 and spacer bar 170 provides stability by resting on telescoping arms 120 such that laptop workstation 100 is securely connected to luggage 110. Central region 210 is preferably angled 20 degrees below a horizontal plane perpendicular to the luggage 110, which adds an ergonomic configuration, making it easier to type on the computer keyboard. Central region 210 is able to support a laptop 130. An alternate configuration of central region 210 is in a horizontal plane perpendicular to the luggage 110. Spacer bar 170 engages telescoping arms 120 in an assembled mode to stabilize laptop work-station 100. Second ends 200 are preferably 8 inches apart from each other in an assembled mode.

Laptop 130, as seen in FIG. 1, is placed on pads 190. Flexible strap 140 is then wrapped around the laptop 130, and the buckle 240 is engaged to hold the laptop 130 onto laptop workstation 100, in a position convenient for use. The buckle 240 is made of any well-known closure in the art of flexible straps. Preferably, the buckle 240 is made of one of the following: a combination of plastic and steel quick release buckle, Velcro®, a hook or a snap.

Figure 4:
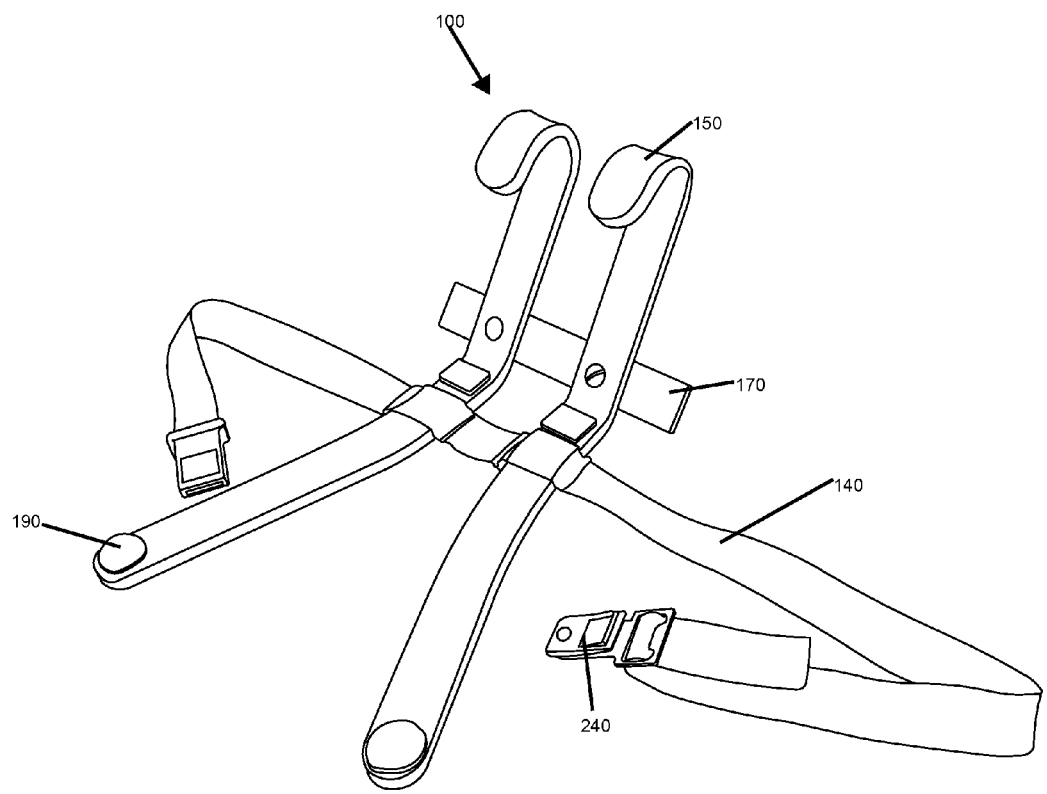
FIG. 4 shows a perspective view of the laptop workstation for carry-on luggage assembled and not attached to luggage.
Figure 5:
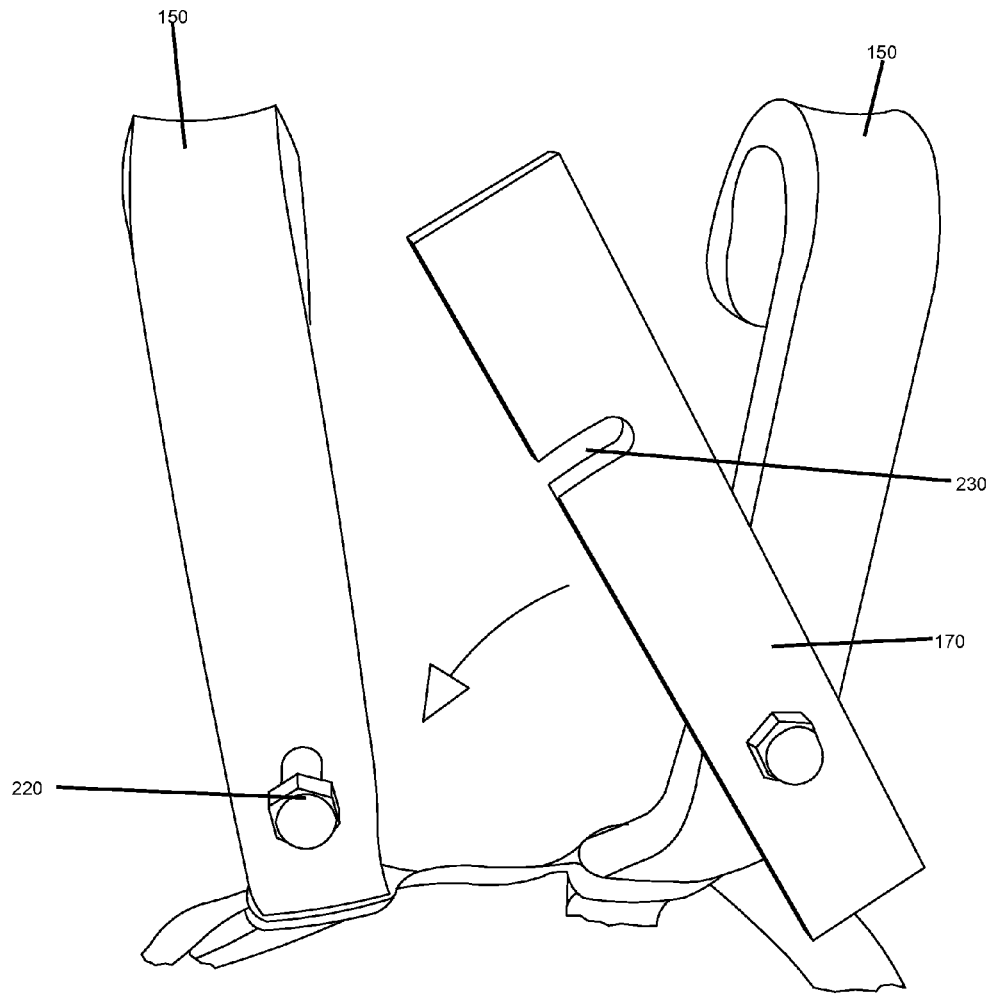
FIG. 5 is a back view of the laptop workstation for carry-on luggage of the disclosed technology.
Figure 6:
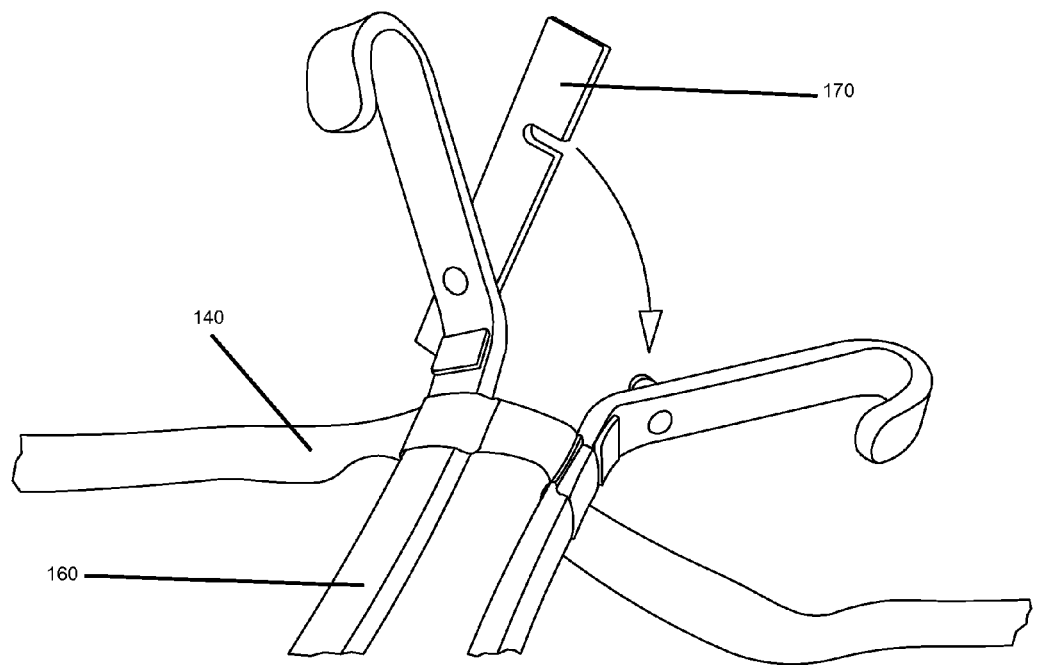
FIG. 6 is a fragmented view of the laptop workstation for carry-on luggage in a disassembled arrangement of the disclosed technology.

FIG. 4 shows the laptop workstation 100 not connected to luggage 110 but with the spacer bar 170 connected to both rigid members 160 (or 165 in FIG. 8). As seen in FIG. 5, spacer bar 170 is connected permanently to only one rigid member 160 or 165 and it moves or pivots about a vertical axis. Spacer bar 170 is removably attached to the second rigid member 160 or 165. Now referring to FIG. 5, the preferred removable attachment to the second rigid member 160 is with a protrusion connected to a back of the second rigid member 160. Spacer bar 170 further having an indent 230. Spacer bar 170 pivots down, and protrusion 220 engages indent 230, keeping the rigid members 160 or 165 spaced apart in the proper configuration and creating an assembled mode.

In assembled mode, the spacer bar 170 rests against telescoping arms 120 of the luggage 110 and supports laptop 130. Also, when the spacer bar 170 is not engaged with the second rigid member then both rigid members 160 or 165 are only attached by flexible strap 140. This configuration allows for quick set up and disassembly of the current technology without the use of tools.

Preferably, spacer bar 170 is attached to one of the rigged members 160 with a screw and lock nut. Indent 230 of spacer bar 170 is preferably ⅝ of an inch deep and ¼ to ¹⁷⁄₆₄ of an inch wide. Protrusion 220 is preferably a screw with a lock nut. The screw with a lock nut is preferably a ¼-20×¾ inch screw. The same screw is preferably used to permanently attach spacer bar 170 to rigid member 160 or 165.

Figure 7:
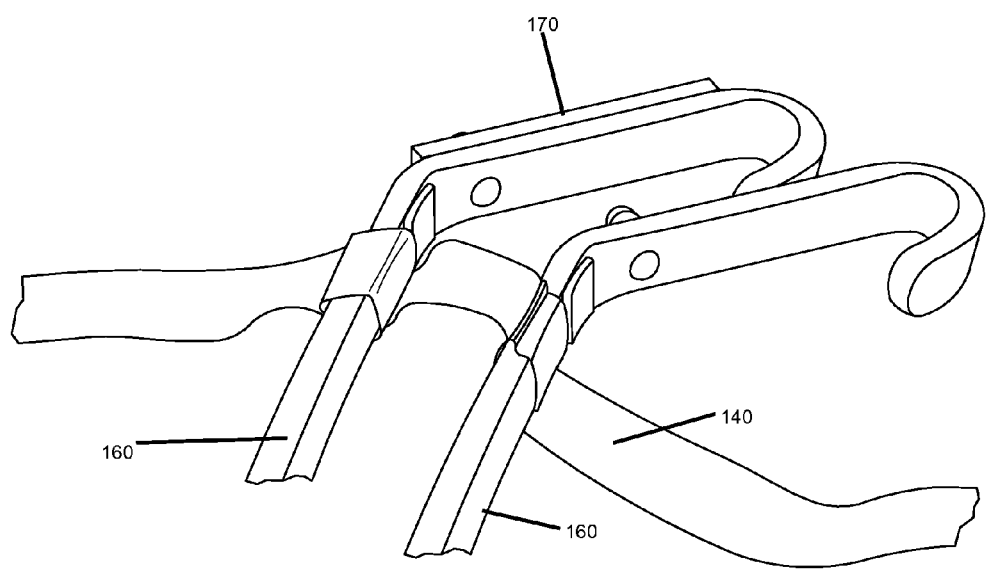
FIG. 7 is a fragmented view of the laptop workstation for carry-on luggage in a disassembled and ready to store arrangement of the disclosed technology.

Moving on to FIG. 7. FIG. 7 shows the laptop workstation 100 when spacer bar 170 is not engaging protrusion 220 and the rigid members 160 are only attached by flexible strap 140. The alternate embodiment of cylindrical rigid members 165 also works this way. The spacer bar 170 is placed adjacent and parallel with one rigid member 160 or 165. This position while not assembled creates a low profile and small size for easy storage in a suitcase 110 or briefcase.

A method of using the laptop workstation 100 starts with a user taking a folded workstation 100 out from storage. Folded workstation 100 would have the spacer bar 170 not engaged with protrusion 220. Spacer bar 170 is also adjacent to and parallel to one rigid member 160 or 165. Spacer bar 170 is now swung to a position perpendicular to rigid members 160 or 165 that engage the protrusion 220 with indent 230 of spacer bar 170. Hooks 150 are hooked onto the handle portion of telescoping handle 120. Spacer bar 170 is then positioned to rest against the telescoping handles 120. Laptop 130 is placed on central region 210 of rigid members 160. Flexible strap 140 is placed around laptop 130 and connected with buckle 240 holding the laptop 130 in place.

Disassembly of the laptop workstation 100 is accomplished by first disconnecting buckle 240. Laptop 130 is then removed. Hooks 150 are unhooked from telescoping handle 120. Spacer bar 170 is pivoted upward and indent 230 is disengaged from protrusion 220. Spacer bar 170 is then positioned adjacent to and parallel to one rigid member 160 or 165. This unassembled position creates a low profile and small size for easy storage in a suitcase 110, luggage, computer storage case or briefcase.

It is recognized by those skilled in the art that changes may be made to the above described embodiments of the disclosed technology without departing from the broad inventive concept thereof. It is understood, therefore, that this technology is not limited to the particular embodiments disclosed but is intended to cover all modifications which are in the spirit and scope of the disclosed technology.

I claim:

1. A device for creating a surface for holding a laptop on a telescoping arm of a traveling case in assembled mode comprising: two spaced apart, rigid members which are parallel at a first end and central region, and obtuse, relative to each other, at a second end; the first end having hooks at an extreme end of the rigid members and is defined by the distance extending between the hooks at an extreme end of the rigid members and an acute bend, the acute bend being acute relative to the rest of the respective rigid members; the second end having an obtuse angle between each of the spaced apart, rigid members; and central region is between the first and second ends and has a flexible strap which extends perpendicular to the first end of the rigid members and is connected at the central region to both rigid members, the flexible strap adapted for attachment to a laptop computer said flexible strap connected to each rigid member and spanning an area created by the spaced apart rigid members; a spacer bar located between the spaced apart rigid members and longer than the distance of the spaced apart rigid members; said spacer bar connected to the rigid members at a back side of the rigid members and on the rigid members first end near the acute bend; said hooks removably attach to a top handle of an extended telescoping arm of a traveling case and said spacer bar engages a vertical section of telescoping arm such that the device is securely connected to said traveling case.

2. The device of claim 1, wherein the traveling case is one of the following: suitcase, briefcase, computer storage case or luggage.

3. The device of claim 1, wherein the device has a disassembled mode.

4. The device of claim 1, wherein central region and second end further comprises at least two pads of non slip material on a front side of rigid members to rest the laptop on.

5. The device of claim 4, wherein the flexible straps are used to close around and hold a laptop once placed on the pads.

6. The device of claim 5, wherein the flexible strap is secured with a buckle, Velcro®, hook, or snap.

7. The device of claim 4, wherein the central region is twenty degrees below a horizontal plane that is perpendicular to the traveling case.

8. The device of claim 1, wherein:
wherein the device has a disassembled mode;
said spacer bar is connected moveably and permanently to only one of the rigid members and is movable around a vertical axis of the movable and permanent connection and;
said spacer bar is removably attached to a second rigid member.

9. The device of claim 8, wherein a protrusion is at a back side of the second rigid member and on the second rigid member's first end near the acute bend and said protrusion engages an indent on the spacer bar when the device is in assembled mode.

10. The device of claim 4, wherein there are at least four pads from one of or a combination of the following: rubber, silicone rubber, santoprene, thermoplastic rubber, and neoprene.

11. The device of claim 1, wherein the rigid members and spacer bar are made of one or a combination of the following materials; aluminum, steel, brass, stainless steel, plastic, acrylic, bent wood and brass.

12. The device of claim 1, wherein the rigid members are rectangular cylinders of between ¾ to ⅞ of an inch wide or round cylinders between ¾ to ⅞ of an inch diameter.

13. The device of claim 1, wherein the spacer bar is between 6 to 8 inches long.

14. The device of claim 1, wherein the rigid members are between 8 to 12 inches long from the acute bend to second end.

15. The device of claim 8, wherein in disassembled mode: spacer bar is unconnected to the second rigid member and rotated to a position adjacent and parallel to both rigid members; and rigid members are permanently attached by flexible straps; and rigid members are moved adjacent to each other such that the device in now in a low profile for storage.

16. The method of using the device of claim 8, wherein:
a disassembled device with the spacer bar not connected to the second rigid member and parallel to the rigid members is removed from storage;
the spacer bar is then moved around the vertical axis to removably attach to the second rigid member;
then hooks are hooked onto a handle portion of telescoping arm of a traveling case and spacer bar is engaged to rest against the vertical portion the telescoping arm;
a laptop is then placed on a central region and second end;
and flexible straps are placed around laptop and connected to hold laptop securely in place.

17. The method of storing the device of claim 8, wherein:
A laptop is taken off the device by first disconnecting flexible straps from around the laptop and then lifting off said laptop;
hooks are then unhooked from telescoping arm handle;
then spacer bar is unattached from the second rigid member and moved around the vertical axis and positioned adjacent to and parallel to the rigid members creating a low profile and small size for easy storage.

* * * * *